United States Patent [19]
Hammer

[11] Patent Number: 6,002,477
[45] Date of Patent: Dec. 14, 1999

[54] SPECTROPHOTOMETER

[75] Inventor: Michael Ron Hammer, Sassafras, Australia

[73] Assignee: Varian, Inc., Palo Alto, Calif.

[21] Appl. No.: 09/068,798

[22] PCT Filed: Sep. 16, 1997

[86] PCT No.: PCT/AU97/00603

§ 371 Date: May 15, 1998

§ 102(e) Date: May 15, 1998

[87] PCT Pub. No.: WO98/12541

PCT Pub. Date: Mar. 26, 1998

[30] Foreign Application Priority Data

Sep. 16, 1996 [AU] Australia ................................ PO 2363
Jun. 17, 1997 [AU] Australia ................................ PO 7355

[51] Int. Cl.$^6$ ........................................................ G01J 3/42
[52] U.S. Cl. .................................. 356/307; 356/319
[58] Field of Search .................................. 356/307, 319, 356/323, 325, 326, 328

[56] References Cited

U.S. PATENT DOCUMENTS 4,076,421  2/1978  Kishner .
4,857,735  8/1989  Noller .
5,175,697 12/1992  Kawagoe et al. ........................ 356/319

FOREIGN PATENT DOCUMENTS 0 242 725 A2 10/1987 European Pat. Off. .
0 274 403 A2  7/1988 European Pat. Off. .
0 306 337 A2  8/1989 European Pat. Off. .
   2089971    6/1982 United Kingdom ................... 250/302

*Primary Examiner*—F. L. Evans
*Attorney, Agent, or Firm*—Edward H. Berkowitz

[57] ABSTRACT

A spectrophotometer including a light source (1) operative to emit a beam of light (15), an optical system for directing the light beam (15) to a sample (8) to be analyzed, and a detector (9) which detects the intensity of the light beam after the beam interacts with the sample (8). The light source (1) is operative to emit bursts of light separated by an interval during which no light is emitted. By way of example, a xenon tube may be used for that purpose. The spectrophotometer measures the intensity of the light beam generated by each burst of light after that beam interacts with the sample. Each such light beam may be divided into first and second parts (5 and 4) prior to interaction with the sample (8), and the optical system is arranged to direct the first part (5) to the sample (8) and to direct the second part (4) to a second detector (7) for conducting a reference measurement. A dark signal measurement may be conducted immediately before or after each burst of light.

20 Claims, 4 Drawing Sheets

SPECTROPHOTOMETER

This invention relates to spectroscopy and is particularly concerned with ultraviolet/visible/infrared spectrophotometers.

Conventional ultraviolet/visible/infrared spectrophotometers use one or more light sources that continuously emit light. For example, a popular combination is a deuterium arc lamp and a quartz halogen filament lamp to cover the ultraviolet and visible/infrared portions of the spectrum respectively. In order to obtain high quality readings from an instrument, it is necessary to obtain three separate measurements. A measurement of the intensity of the light source without any sample present (called the reference measurement), a measurement of the intensity when the sample is present (called the sample measurement) and a measurement of the signal when no light from the source reaches the detector (called the dark signal). A measurement of the fraction of light not absorbed by the sample can then be computed as:

(sample-dark)/(reference-dark).

In order to obtain such measurements it is common practice to use a mechanical chopping mechanism which, depending on it's position, directs the beam from the source along either of two paths. One path bypasses the sample and goes to a detector for reference measurement whereas the other path passes to the sample and then goes to a detector for sample measurement. The chopping mechanism also functions to block the light beam from the source to the detector for dark measurement.

Such an arrangement has some significant disadvantages. Firstly, since the chopper is a mechanical device there is a practical limit at which the system can switch from one measurement to the next measurement (typically more than 1 millisecond and frequently about 10 milliseconds). Any changes in the system conditions during this switching time will not be correctly eliminated. For example, if the light source fluctuates in output with time, changes in effective intensity between sample and reference measurements will not be eliminated. Furthermore, a major component of the dark measurement is room light entering the optical path between light and detector, and the intensity of room light can fluctuate significantly and rapidly with time especially if fluorescent lights are used in the room. Changes in this intensity between dark and sample or dark and reference measurements will not be cancelled correctly. The problem is particularly evident in spectrophotometers in which the spectral resolution subsystem is placed before the sample. In such arrangements only a very small fraction of the source light passes through the spectral resolution subsystem and consequently the source light intensity on the sample is relatively low. Room light ingress is therefore a significant factor and in a conventional instrument it is necessary to take steps to rigidly exclude all room light.

The aforementioned problem is not so evident in spectrophotometers in which the spectral resolution subsystem is placed after the sample and thus illuminate the sample with white light since the total light intensity from the source is usually much larger than the room light accepted into the optical path. On the other hand, such instruments have very significant limitations when measuring some types of samples. Light at wavelengths other than the wavelength of interest can excite fluorescence which causes the sample to emit additional light at the wavelength of interest. A second problem is the total amount of light incident on the sample which can be sufficient to affect the sample and thereby cause errors in the measurement process.

Another disadvantage of the conventional arrangement is that the light source usually needs some time to stabilise (for the operating temperature to equilibrate) and is therefore left on while the instrument is switched on, regardless of whether or not measurements are being made. Sample measurement occurs over a small portion of the time the instrument is switched on and as a result continuous energisation of the light source wastes power and shortens the useful life of the light source. In addition the sample remains illuminated during the time it is within the sample compartment and as a consequence the total light load experienced by the sample can be very significant in some circumstances. This can be a problem for samples which are photosensitive (quite common for kinetics samples).

An object of the present invention is to overcome or at least alleviate the aforementioned disadvantages. It is a further object of the invention to provide a spectrophotometer which is relatively inexpensive and which nevertheless enables relatively accurate sample analysis.

A spectrophotometer according to the invention is characterised in that the light source is pulsed so that short intense bursts of light are generated and no light is emitted between successive bursts. An example light source suitable for that purpose is a Xenon flash tube. It is preferred that the dark signal measurement occurs at a time close to the time (e.g., within 500 microseconds) at which the sample and reference measurements occur. The dark signal measurement may be effected by explicitly measuring the signal level directly before a pulse or burst of light is generated, or it may be effected by electronically adjusting the detector output to zero directly before a pulse or burst of light is generated. An instrument according to the invention preferably includes two detectors and an optical system arranged to permit simultaneous measurement of the sample and the reference. At least the sample measurement and the reference measurement can be conducted on two optical signals derived from the same burst of light, and it is preferred that those signals are simultaneously derived from that burst of light.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

Figure 1:
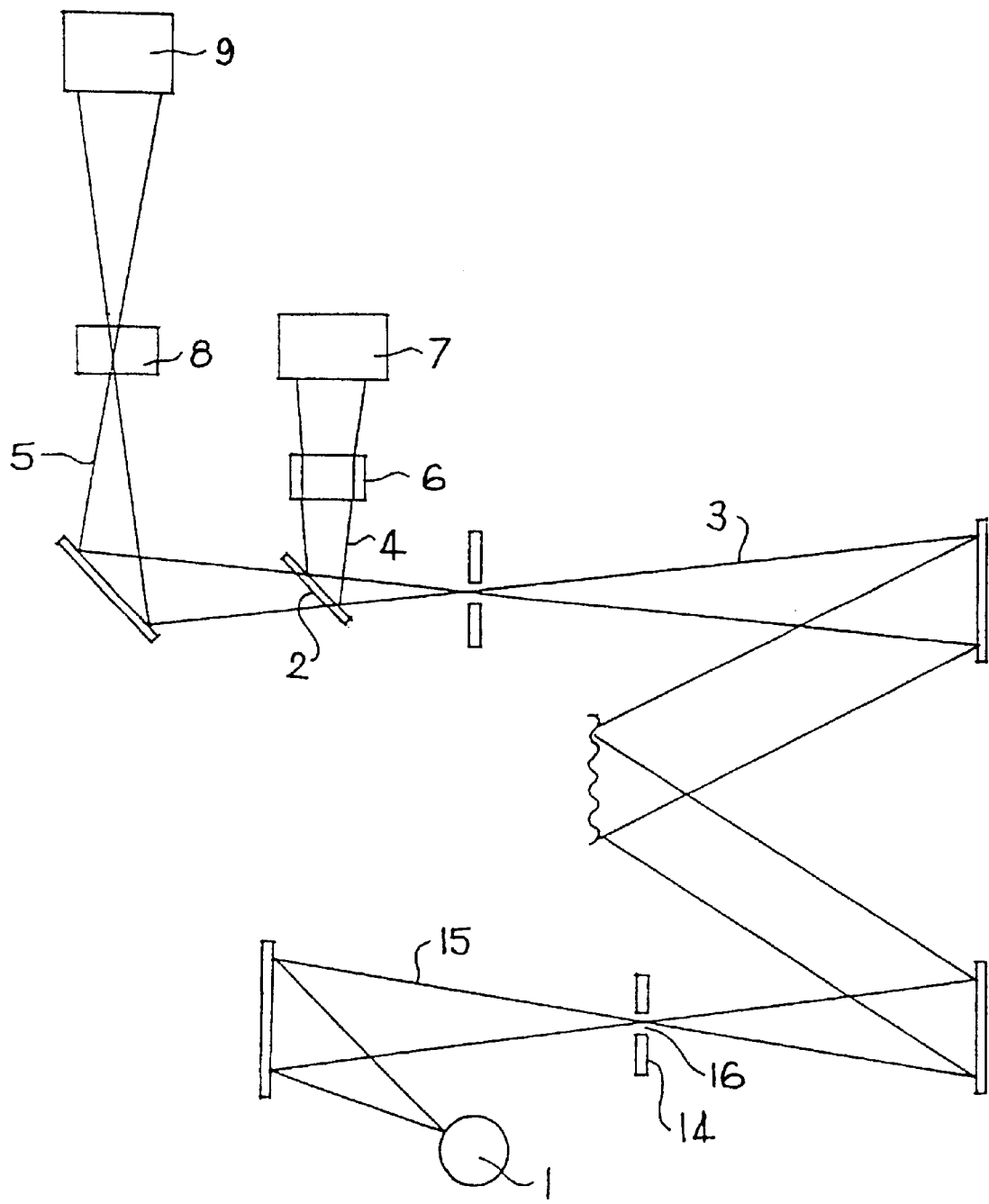
FIG. 1 is a diagrammatic illustration of a spectrophotometer according to one embodiment of the invention.

In the arrangement shown by FIG. 1 a pulsed light source 1 such as a Xenon flash tube is operable in a known manner to emit very short intense bursts of light each of which could, for example, have a duration of 2 to 20 microseconds. No light is emitted in the interval between successive bursts. The optical arrangement shown by FIG. 1 includes a fixed beam splitter 2 which divides the incident light beam 3 received from the lamp 1 into two beams 4 and 5 having a predetermined intensity ratio. By way of example, the two beams 4 and 5 can be of substantially equal intensity. The beam 4 is directed through an optional reference cell 6 and from there passes to a reference detector 7. The beam 5 is directed to a sample cell 8 and from there passes to a sample detector 9. Such an arrangement has the advantage of enabling simultaneous detection of the optical signals upon which the reference and sample measurements are based, thereby eliminating problems which can arise out of unpredictable variation in the intensity of the two signals. The final processing of each of the signals which results in the reference measurement and the sample measurement respectively, may or may not occur in parallel at the same time.

The arrangement shown by FIG. 1 involves transmission measurement of the sample. That is, the beam 5 passes through a cell 8 containing the sample to be analysed. It is to be understood that the invention is also applicable to spectrophotometers in which the sample to be analysed is subjected to reflectance measurement and consequently do not require the presence of a cell as such.

Since the lamp 1 does not emit light in the time interval between successive bursts of light there is no need for mechanical means to interrupt the light beam in order to determine the dark signal measurement. Furthermore, since the duration of each light pulse is short it is possible to achieve a very short delay between the dark signal measurement and the sample/reference measurement if the dark signal measurement is effected directly or immediately before or after generation of a lamp pulse. By way of example the delay could be in the order of 20 to 30 microseconds.

The dark signal measurement could be effected by explicitly measuring the signal level immediately before the lamp 1 is triggered to generate a pulse of light, and subtracting that measurement from other readings as adopted in conventional systems. Alternatively, the dark signal measurement could be effected by electronically adjusting the detector output to zero immediately before the lamp 1 is triggered to generate a pulse of light. An example arrangement utilising that alternative is illustrated by FIGS. 2 and 3.

Figure 2:
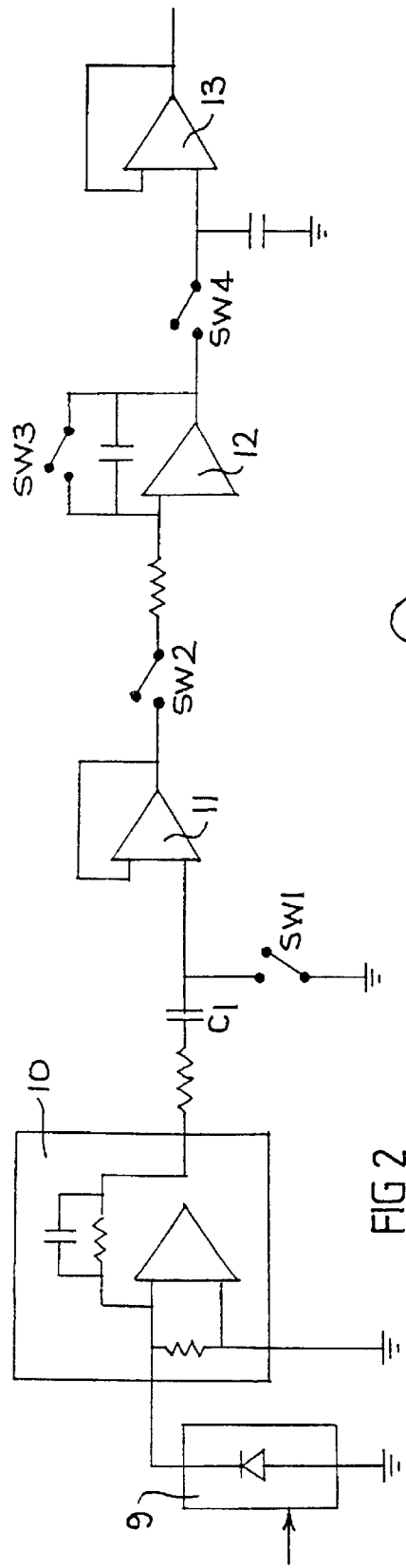
FIG. 2 is a diagrammatic illustration of one form of controlled circuit for use with the spectrophotometer of FIG. 1.
Figure 3:
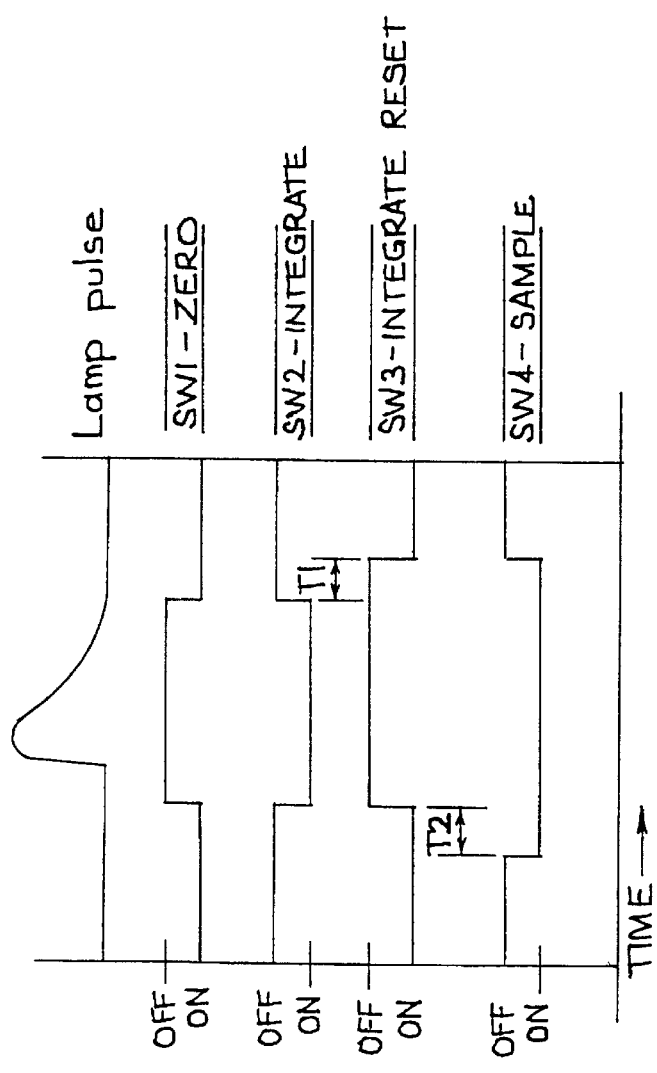
FIG. 3 is a diagrammatic illustration of the manner of operation of the circuit shown by FIG. 2.

FIG. 2 shows an example circuit layout in which the signal from the sample detector 9 passes through an amplifier 10 and depending upon the condition of switches as hereinafter discussed travels from the amplifier 10 through a circuit including a buffer 11, integrator 12 and a further buffer 13. A corresponding circuit layout will be provided for the signal generated by the reference detector 7, but is not shown for convenience of illustration. The following description of the circuit layout of FIG. 2 is therefore to be understood as also applying to the corresponding circuit layout for the reference detector 7.

During the time preceding the light pulse, the switch SW1 is held closed to ensure that the input to the buffer amplifier 11 is held at zero. Any output from the detector amplifier 10 appears as a voltage across the capacitor C1 where it is automatically subtracted from any subsequent light reading. At the same time, switch SW2 is opened and switch SW3 is closed to ensure that the integrator 12 is held reset (at ground potential). When the light pulse is generated the switches SW1, SW2 and SW3 are opened, closed and opened respectively as shown by FIG. 3, and switch SW4 is closed a short time (T2) before the light pulse so as to allow the sample/hold amplifier 13 to be reset by the integrator 12. The condition of the various switches at that time allows the integrator 12 to start integrating the detector signal 9 by way of the amplifier 10 and the buffer 11. Only changes in the output of the detector amplifier 10 since switch SW1 was opened will appear at the input of the buffer amplifier 11 for the reason described above. After the light pulse ceases the switch SW1 is closed and the switch SW2 is opened to prevent further integration. Switch SW4 remains closed for a short period of time (T1) to allow the sample/hold buffer 13 to settle after which the switch SW4 opens and the switch SW3 closes holding the integrated output from the detector 9 on the output of buffer 13.

Circuit layouts other than that described above could be adopted to achieve the same result.

Figure 4:
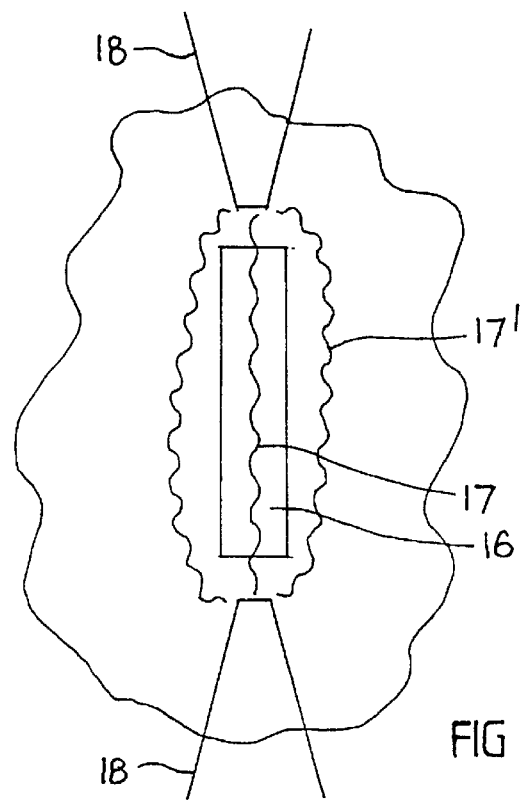
FIG. 4 is a diagrammatic illustration of the relationship between the monochromator entrance slit and the arc position of the light source which exists in prior art arrangements.

The lamp 1 may have a particular disposition relative to the monochromator 14 (FIG. 1). The arc position of the Xenon flash tube tends to move from flash to flash with the result that the reflected beam of light 15 from the lamp 1 will only occasionally be accurately positioned over the entrance slit 16 of the monochromator 14. That has the effect of causing significant variation in the energy received by the monochromator from successive flashes of the lamp 1. In a conventional arrangement as shown by FIG. 4, the arc of the lamp 1 is disposed relative to the monochromator slit 16 such that the arc movement, which is represented by line 17' compared to line 17, is transverse to the direction of the slit 16. Reference 18 represents the image of the lamp electrodes. In a possible arrangement according to the present invention the lamp arc may be disposed so that arc movement is in the direction of the slit 16 as shown by FIG. 5.

Figure 5:
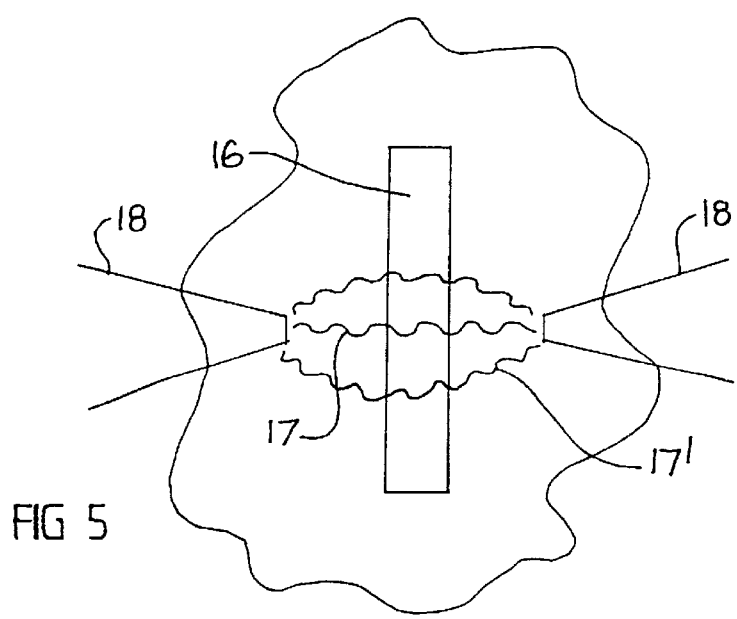
FIG. 5 is a diagrammatic illustration similar to FIG. 4, but showing a different relationship as adopted in one embodiment of the invention.

An arrangement as shown by FIG. 5 can reduce the sensitivity to arc movement, but could reduce the light throughput. If desired, loss of light might be minimised by using a flash tube having a short arc length. For example, an arc length of 1.5 to 2 millimeters might be suitable.

It will be apparent from the foregoing description that a spectrophotometer incorporating the present invention is relatively insensitive to variation in room light because of the brief delay between the dark signal measurement and sample/reference measurement. It is therefore not necessary to place the sample in a light proof compartment and that has a number of benefits.

A further advantage of a spectrophotometer according to the invention is that simultaneous detection of sample and reference beams results in a system largely immune to fluctuations in light source intensity. Use of a pulsed light source then enables energisation of the light source to be confined to the time over which a measurement is to be made, thereby reducing power consumption and very significantly extending the life of the light source. Furthermore, the rate of pulsing the light source can be adjusted according to the measurement being made. For example, when carrying out measurements of sample absorbance versus wavelength the light source can be pulsed very rapidly (typically about 100 times per second or even faster if necessary compared to a mechanical chopping rate in conventional instruments of typically 30 times per second). This allows many more data points to be collected per second leading to faster analyses. Alternatively, when conducting lengthy kinetics experiments the flash rate can be reduced, thus reducing the total light load on the sample while still collecting enough data to characterise the variation of absorbance with time. For example, if the duration of the kinetics experiment is say 1 hour, a reading every 10 seconds is quite sufficient to determine the absorbance/time relationship. The lamp is therefore flashed only once every 10 seconds.

Compared to a conventional arrangement, this reduces the total light load on the sample by about a factor of 1000 times (typically the light load imposed by the system on the sample with the lamp flashed 100 times per second is comparable to conventional instrument). This difference can mean the difference between an accurate answer and meaningless data.

Another advantage of a spectrophotometer according to the invention is that the pulsing of the light source (and thus a measurement instant) can be synchronised with an external event or condition. The combination of a short duration pulse and control of the triggering of a pulse makes it possible to synchronise a measurement instant with an external event (or another event within the measurement system) to within microseconds. For example, as shown diagrammatically by FIG. 6, the invention allows measurements to be taken at particular instants on a continuously moving system with considerable accuracy. Such a continuously moving system could be a carousel 19 carrying cuvettes 8 each of which contains a respective sample for spectrophotometric analysis. Any suitable control means 20 can be adopted to synchronise positioning of the samples cuvettes 8 with emission of bursts of light by the light source 1. Thus the invention provides an improved measurement resolution which allows for such a carousel 19 to be rotated smoothly and continuously and for measurements to be taken on each sample as it passes through the measurement position. In contrast, the measurement resolution in the prior art using a mechanical chopping mechanism requires that such a carousel 19 be rotated in a step-wise manner to bring each sample to the measurement position and to be held there for sufficient time for the measurements to be taken. It is believed that the invention can provide up to 3 orders of magnitude improved time resolution for some tasks.

Figure 6:
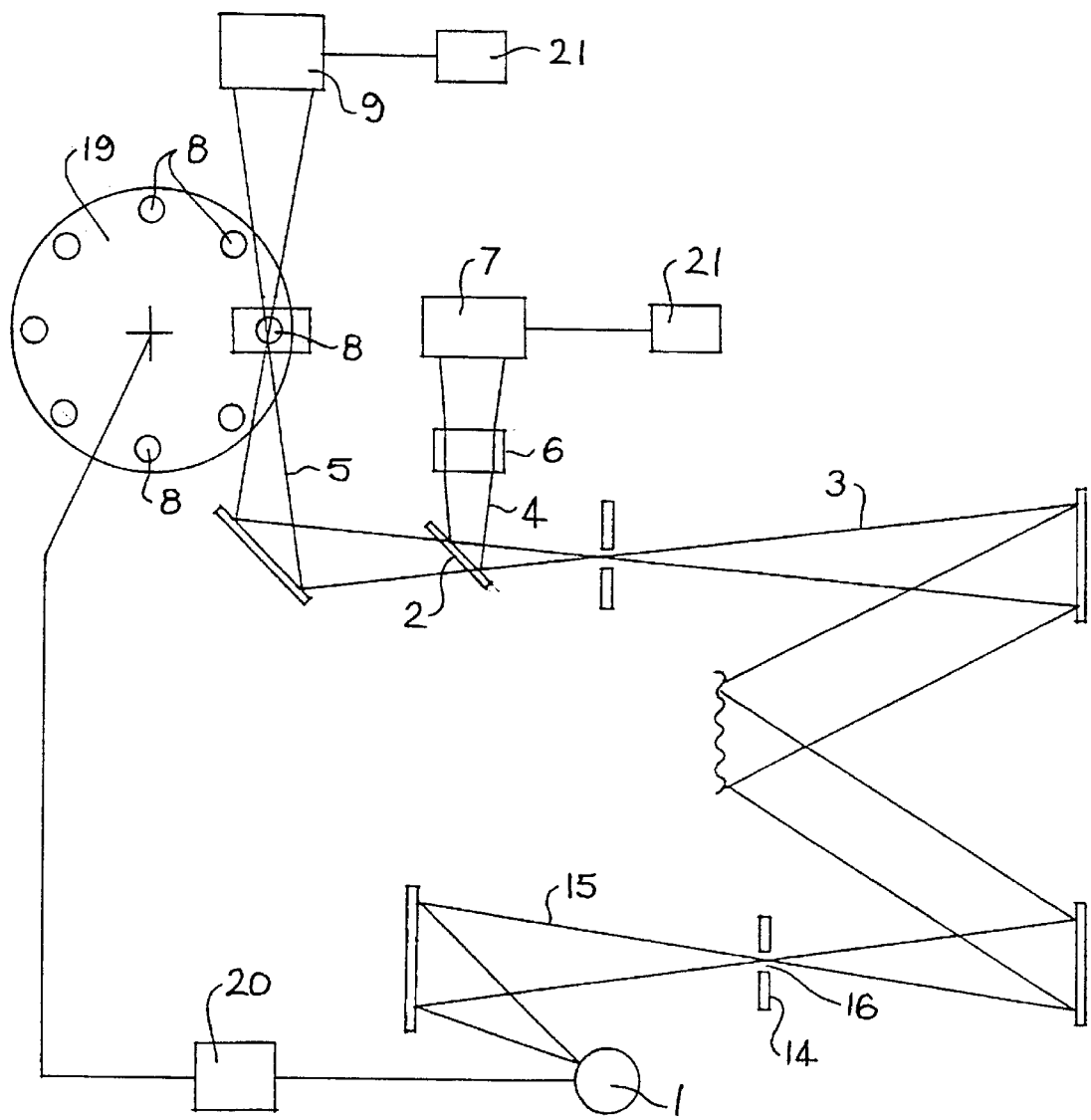
FIG. 6 is a diagrammatic illustration similar to FIG. 1 but showing another embodiment of the invention.

Each of the blocks 21 shown in FIG. 6 represents a circuit of the kind described in connection with FIG. 2.

Still further advantages are realizable from an instrument according to the invention in that its heat generation is less than that of conventional prior art instruments Generally, conventional instruments use light sources with a combined heat dissipation close to 100–120 watts and a total instrument dissipation typically in excess of 150 watts. If the heat generating system of such a prior art instrument is hermetically sealed, complex heat exchange structures must be provided to ensure extraction of this energy, otherwise the instrument will heat up to an unacceptable degree. By contrast, an instrument according to the invention may have an average lamp dissipation of 1 watt and a total instrument dissipation of about 3 watts. It can thus be hermetically sealed readily without requiring complex cooling systems or risking excessive temperature rise. Such hermetic sealing may be necessary for an instrument that is to operate in a corrosive or a dangerous environment (such as in the presence of flammable gases). Hermetic sealing may also be necessary to eliminate any possibility of ozone emission to the atmosphere. Ozone is an inevitable by-product of the generation of UV light down to 190 nm. An instrument according to the present invention is advantageous in this respect in that its light source, by virtue of its intermittent and low power operation, generates less ozone than conventional sources.

In one embodiment of the invention at least the light source and the optical system of the spectrophotometer are sealed against substantial ingress of corrosive or interfering vapours and gases in the surrounding atmosphere. But it is generally convenient to confine the sealed environment to those parts of the optical system other than the part at which the sample is located. That may be necessary or appropriate to enable convenient placement of the sample to be analysed.

Various alterations, modifications and/or additions may be introduced into the constructions and arrangements of parts previously described without departing from the spirit or ambit of the invention as defined by the appended claims.

What is claimed is:

1. A spectrophotometer including a light source operative to emit bursts of light, each two successive bursts of light being separated by an interval during which no light is emitted by said light source, an optical system for directing a beam of each said burst of light to a sample to be analyzed, and a detector which detects the intensity of said light beam after interaction of said beam with said sample and measures a dark signal in immediate proximity to said burst during said interval.

2. A spectrophotometer according to claim 1, wherein said light source is a xenon flash tube.

3. A spectrophotometer according to claim 1 or 2, wherein said detector is operative to conduct a dark signal measurement immediately before or after each said burst of light is emitted.

4. A spectrophotometer according to claim 3, wherein said dark signal measurement is effected by measuring the level of an output signal of said detector immediately before or after said burst of light is emitted.

5. A spectrophotometer according to claim 3, wherein said dark signal measurement is effected by adjusting the output of said detector to zero immediately before said burst of light is emitted.

6. A spectrophotometer according to claim 5, wherein said detector output is adjusted electronically to zero by means of a circuit including, a first buffer for receiving a signal from said detector, a capacitor connecting the output of said first buffer to a high impedance input of a second buffer, and a switch operative to connect said input of said second buffer to zero.

7. A spectrophotometer according to claim 6, wherein said detector is a first detector for conducting a sample measurement, and a second detector is provided for conducting a reference measurement.

8. A spectrophotometer according to claim 7, wherein said optical system includes a beam splitter which divides said beam into first and second beam parts prior to said sample, and said system directs said first beam part to said sample and said second beam part to said second detector.

9. A spectrophotometer according to claim 8, wherein a reference cell is located in the path of said second beam part before said second detector.

10. A spectrophotometer according to claim 7, wherein said sample measurement and said reference measurement are conducted on two optical signals derived from the same said burst of light.

11. A spectrophotometer according to claim 7, wherein a said circuit is connected to the output of each said detector.

12. A spectrophotometer according to claim 2, wherein said optical system includes a monochromator having an entrance slit, and the longitudinal axis of said slit extends in substantially the same direction as that in which the arc position of said xenon flash tube tends to move between successive said bursts.

13. A spectrophotometer according to claim 1, including means for carrying at least two said samples and which is operable to move each said sample in succession into and out of the path of said light beam, and control means which synchronises operation of said light source with movement of said sample carrying means so that said light beam interacts with a said sample while that sample is located within said path.

14. A spectrophotometer according to claim 13, wherein each said sample moves into and out of said light beam path without pause.

15. A spectrophotometer according to claim 1, wherein at least said light source and said optical system are sealed against substantial ingress of corrosive or interfering vapours and gases in the surrounding atmosphere.

16. A spectrophotomer according to claim 15, wherein said seal does not extend to that part of said optical system at which said sample is located.

17. A method of conducting spectroscopic analysis of a sample comprising the steps of, generating successive bursts of light by a light source which does not emit light during a time period separating each two successive said bursts of light, directing the light beam generated by each said burst through the entrance slit of a monochromator to the sample to be analyzed and measuring a light proportional parameter to obtain a measured spectral value, measuring said light proportional parameter during a portion of said time period immediately proximate a corresponding burst to obtain a dark correction signal, measuring the intensity of said light beam after it has interacted with said sample, and reducing said measured value by the dark correction signal to obtain a corrected light proportional parameter.

18. A method according to claim 17, wherein said light beam is divided into first and second parts, directing said first part to said sample and from there to a first detector, directing said second part to a second detector, and measuring the intensity of both said beam parts for each said burst of light.

19. A method according to claim 18, wherein said second beam part interacts with a reference cell before being received by said second detector.

20. A spectrophotometer comprising a light source operative to emit bursts of light, each two successive bursts of light being separated by an interval during which no light is emitted by said light source, said light source possibly tending to produce said bursts in slight random displacement from a light source axis, an optical system for directing a beam of each said burst of light to a sample to be analyzed, said optical system comprising a monochromator having an entrance slit oriented at a substantial angle with respect to said light source axis, and a detector which detects the intensity of said light beam after interaction of said beam with said sample.

* * * * *